United States Patent [19]

Foster

[11] Patent Number: 4,836,874
[45] Date of Patent: Jun. 6, 1989

[54] METHOD OF MASS PRODUCING DAMAGE-RESISTANT COMPACT DISCS

[76] Inventor: Michael S. Foster, 1764 Prospect Dr., Los Angeles, Calif. 90046

[21] Appl. No.: 9,344

[22] Filed: Jan. 30, 1987

[51] Int. Cl.⁴ .......................... B29D 11/00; B32B 3/02
[52] U.S. Cl. .................... 156/209; 156/272.8; 264/13; 264/1.4; 264/2.5; 264/25; 264/78; 264/106; 264/220; 264/284; 264/DIG. 68; 427/53.1
[58] Field of Search .................. 264/1.3, 1.4, 2.5, 1.1, 264/106, 284, 293, 151, 149, 25, 22, 220, DIG. 68, 166, 78; 156/187, 272.8, 209; 427/53.1

[56] References Cited

U.S. PATENT DOCUMENTS

| | | | |
|---|---|---|---|
| 2,274,570 | 2/1942 | Westerkamp | 264/220 |
| 2,334,233 | 11/1943 | Wood | 264/293 |
| 3,768,946 | 10/1973 | Matuschke | 264/106 |
| 4,294,782 | 10/1981 | Froehlig | 264/106 |
| 4,615,753 | 10/1986 | Gregg | 264/107 |
| 4,679,183 | 7/1987 | Staar | 264/106 |

Primary Examiner—James Lowe
Attorney, Agent, or Firm—Kirschstein, Ottinger, Israel & Schiffmiller

[57] ABSTRACT

Compact discs are continuously mass produced by continuously rotating a master roller about whose periphery a plurality of optical disc patterns are sequentially arranged in order to form inverse patterns on an elongated film fed to the roller at successive contact locations spaced apart of one another lengthwise of the film during each rotation. Each optical disc has a metallized layer which is protected from damage by the provision of sheets of non-negligible thickness.

6 Claims, 5 Drawing Sheets

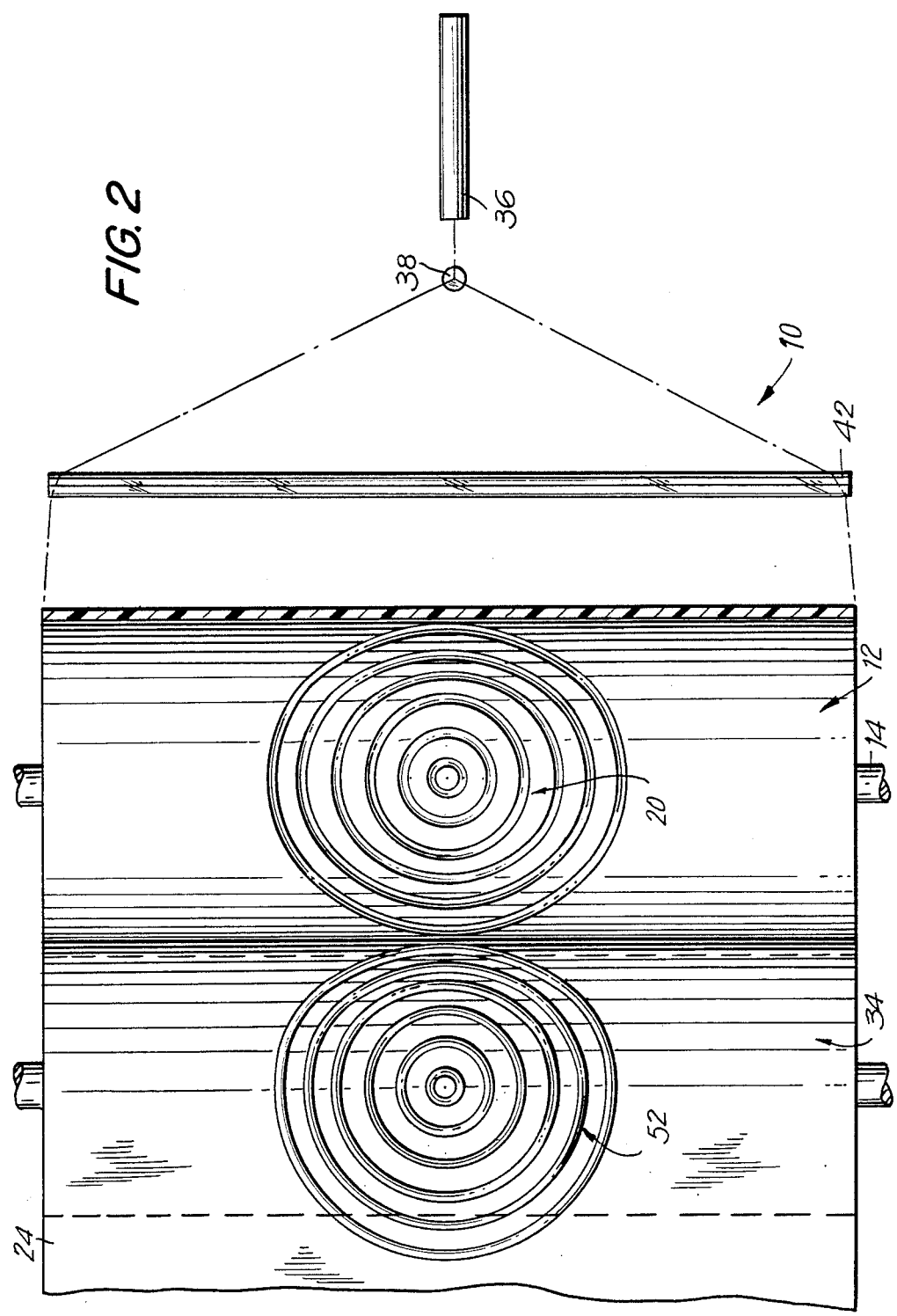

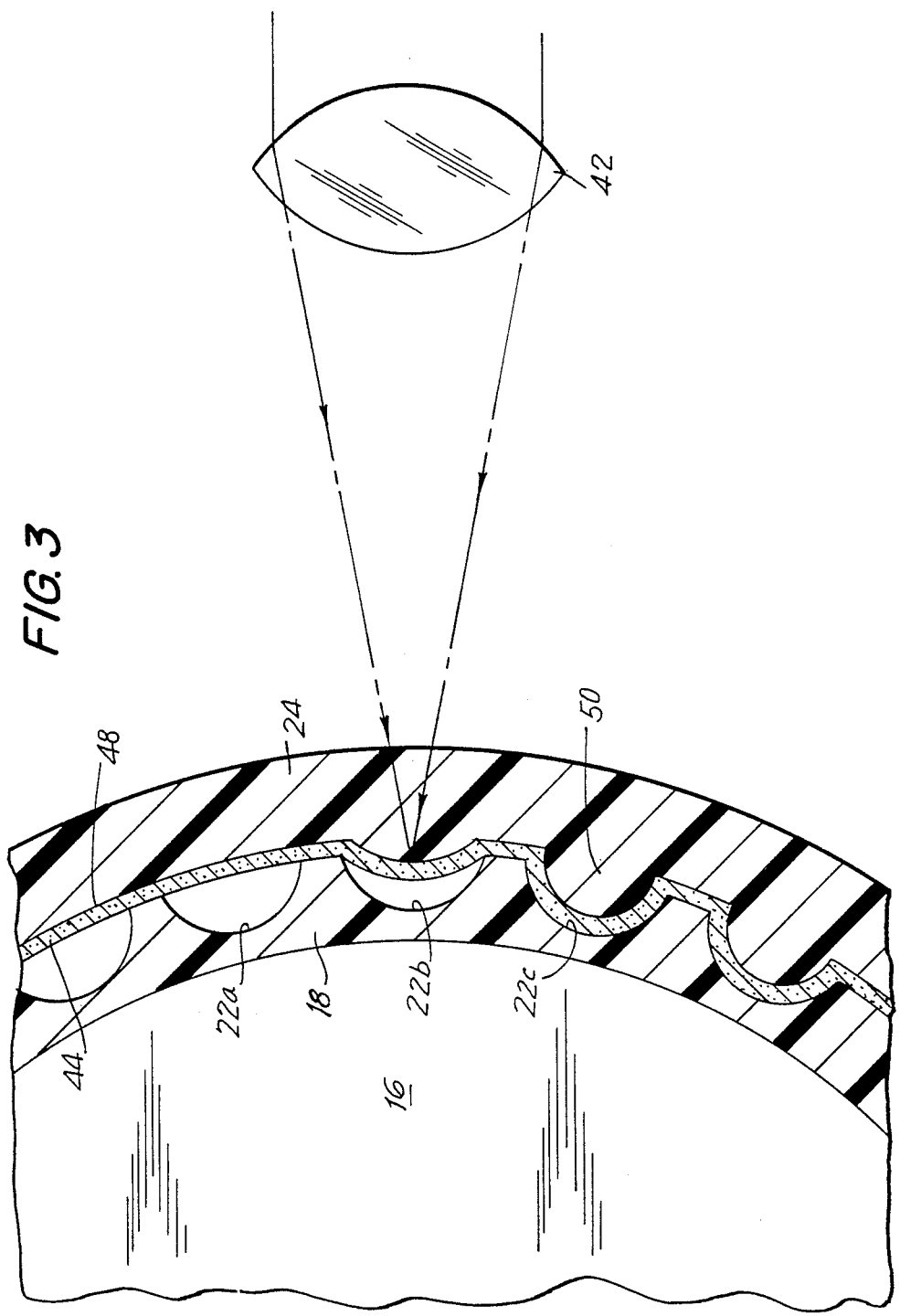

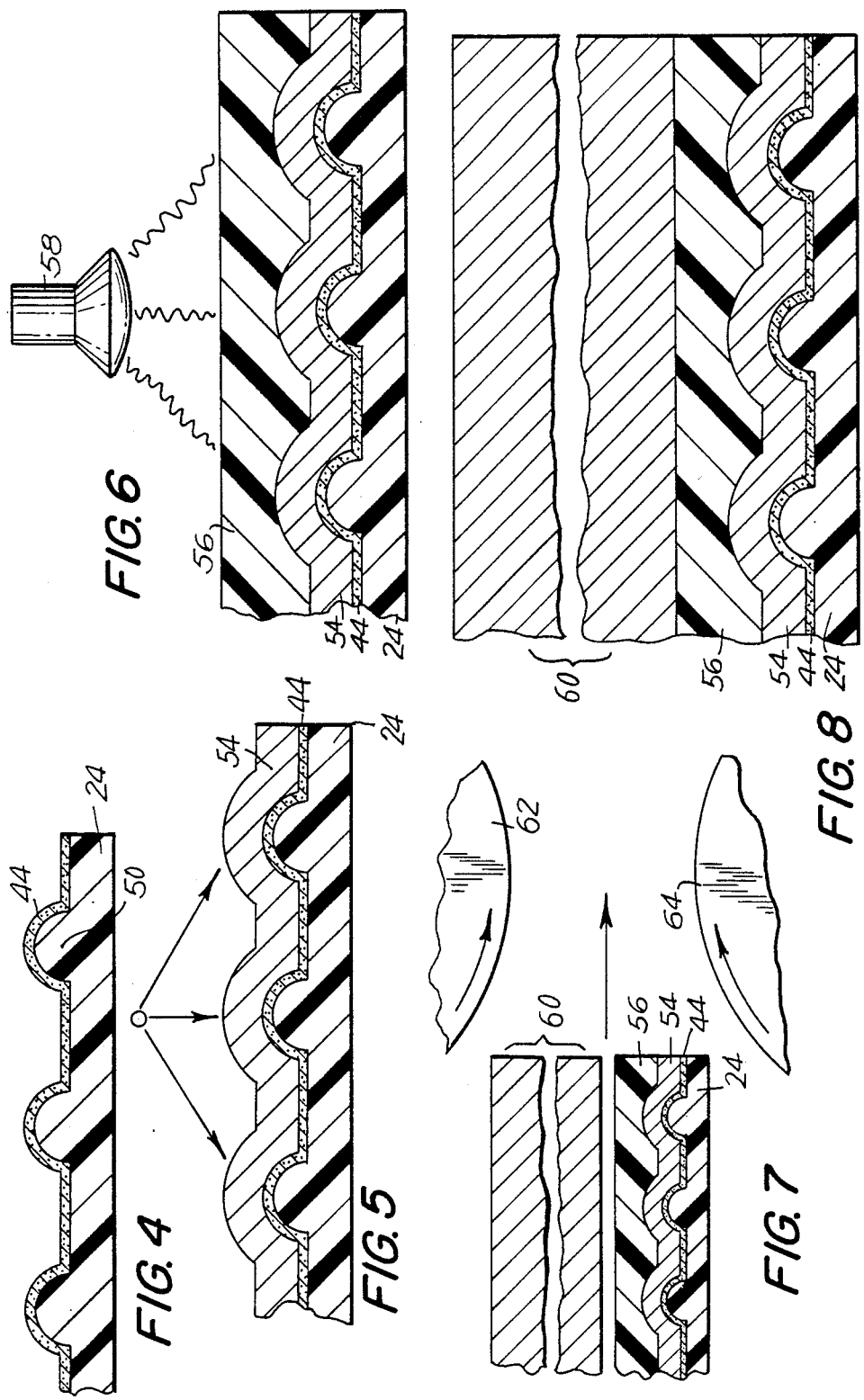

METHOD OF MASS PRODUCING DAMAGE-RESISTANT COMPACT DISCS

BACKGROUND OF THE INVENTION

1. Field of the Invention

This invention generally relates to a method of mass producing compact discs, as well as a novel damage-resistant construction for the discs.

2. Description of Related Art

It is known to fabricate optical discs, also known as compact discs, one at a time in a batch process using injection molding and compression techniques. Although generally satisfactory for their intended purpose in that compact discs of high quality are currently being produced, the known fabrication techniques are very slow, thereby resulting in product shortages, or at least the inability to rapidly meet popular consumer demand for a particular disc. Also, the known fabrication techniques, due to their slow output rate, are very expensive and contribute to a high production price for the disc. The ever-increasing popularity of compact discs for both audio and video information has not been satisfactorily met by a fabrication process capable of efficiently producing discs at a high output rate and at a low production cost.

The known disc itself, although quite sturdy, is nevertheless prone to damage during rough handling. Typically, the known disc has an information-carrying metallized layer which is protected on one side by a rigid carrier sheet of substantial thickness, but on its opposite side s covered merely by a very thin lacquer which is on the order of 1 mil thick. Such a thin lacquer covering is easily pierced, thereby exposing the metallized layer to potential damage.

SUMMARY OF THE INVENTION

1. Objects of the Invention

It is a general object of this invention to overcome the aforementioned drawbacks of the prior art of fabricating compact discs.

It is another object of this invention to fabricate compact discs on a mass-production and inexpensive basis.

A further object of this invention is to reliably protect an information-carrying metallized layer of a compact disc from damage.

2. Features of the Invention

In keeping with these objects, and others which will become apparent hereinafter, one feature of this invention resides, briefly stated, in a method of continuously mass producing optical discs as follows:

At least one, and preferably a plurality of, generally circular, fixed patterns of an optical disc to be produced are formed on an exterior circumferential surface of a rotary roller, preferably of cylindrical construction, elongated along, and rotatable about, an axis of rotation. An elongated film is continuously fed to the roller and into contact with the exterior surface thereof. The roller is continuously rotated about the axis of rotation in order to successively position each pattern at successive contact locations spaced apart of one another lengthwise of the film. An inverse pattern opposite to each fixed pattern is formed at each contact location during each rotation of the roller to form a carrier film along which a series of inverse patterns are formed. The carrier film is continuously withdrawn from the roller.

In accordance with this invention, optical disc patterns are consecutively arranged along the carrier film on a mass production basis. No longer is the art of fabricating compact discs restricted to injection molding and compression batch-type techniques wherein discs are fabricated one at a time. Depending upon the number of patterns arranged consecutively and circumferentially around the roller, the number of inverse patterns formed on the carrier film can be set to any desired value. Over 200 compact discs per minute can be fabricated in accordance with this invention, thereby resulting in low production costs and the ability to rapidly meet consumer demand.

The formation of each inverse pattern is advantageously achieved by irradiating an energy-absorbing region on the film with laser energy which is focused as a linear beam extending axially across the roller on the exterior surface thereof. The laser energy locally softens and thermally deforms the energy-absorbing region of the film, and permits such locally heated regions to assume the inverse or complementary configuration to that of the fixed pattern on the exterior surface of the roller. Advantageously, an energy-absorbing dye layer is fed between the film and the exterior surface of the roller. Alternatively, the film could be pretreated with such a dye color.

Further fabrication steps in the process of producing the compact discs are as follows:

First, a metallized layer is formed over the inverse patterns on the carrier film. A preferred metal is aluminum. Next, a curable resin layer is applied over the metallized layer, and is cured to form a cured layer. A rigid carrier sheet is fixed on the cured layer to form a laminate wherein the metallized layer is protected from damage by the rigid carrier sheet on one side of the metallized layer, and by the film on the opposite side of the metallized layer. The film itself has a non-negligible thickness on the order of 5 mils which is sufficient to better protect the metallized layer, as compared to prior art constructions wherein the metallized layer is protected from below merely by a very thin lacquer covering.

As noted above, each inverse pattern is formed by the local heating of a dyed region of the film with the use of a linear laser beam extending axially of the roller. The use of a linear laser beam is very advantageous and speeds up the production rate, since it heats the film across its entire width one line at a time, as opposed to prior art techniques which focus a laser beam to a circular spot cross-section.

Still another feature of this invention resides in the making of the roller itself, particularly one that has a resin coating. More particularly, a father sheet having a predetermined optical disc pattern, and a curable resin layer, are fed together into a nip formed between a metal roller and a pressure roller. The resin layer and the father sheet are wrapped about an exterior surface of the metal roller under pressure from the pressure roller, thereby transferring a reverse pattern opposite to said predetermined pattern to the resin layer. Thereupon, the pressure roller is moved away from the metal roller, and the father sheet is peeled off and removed from the resin layer after the same has been cured. The resulting metal roller overlaid by the cured resin layer now constitutes a master roller for use as described above. To prevent adhesion or sticking of the film on the resin layer during rotation of the master roller, this invention also embodies treating the cured resin layer with a release agent.

As a final step, the generally circular optical disc patterns in laminate form may be cut out of surrounding laminate material into circular shapes suitable for use in video disc and/or audio disc players.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 2 is a top plan view taken along line 2—2 of FIG. 1;

FIG. 3 is an enlarged close-up view of a detail of the arrangement of FIG. 1;

FIG. 4 is an enlarged sectional view of a carrier film produced by the arrangement of FIG. 1;

FIG. 5 is a cross-sectional view showing the metallizing of the carrier film of FIG. 4;

FIG. 6 is a cross-sectional view showing the curing of a resin layer on the metallized film of FIG. 5;

FIG. 7 is a cross-sectional view of a subsequent stage of the processing of a compact disc in accordance with this invention;

FIG. 8 is a cross-sectional view of the compact disc at the conclusion of fabrication;

DETAILED DESCRIPTION OF THE PREFERRED EMBODIMENTS

Figure 1:
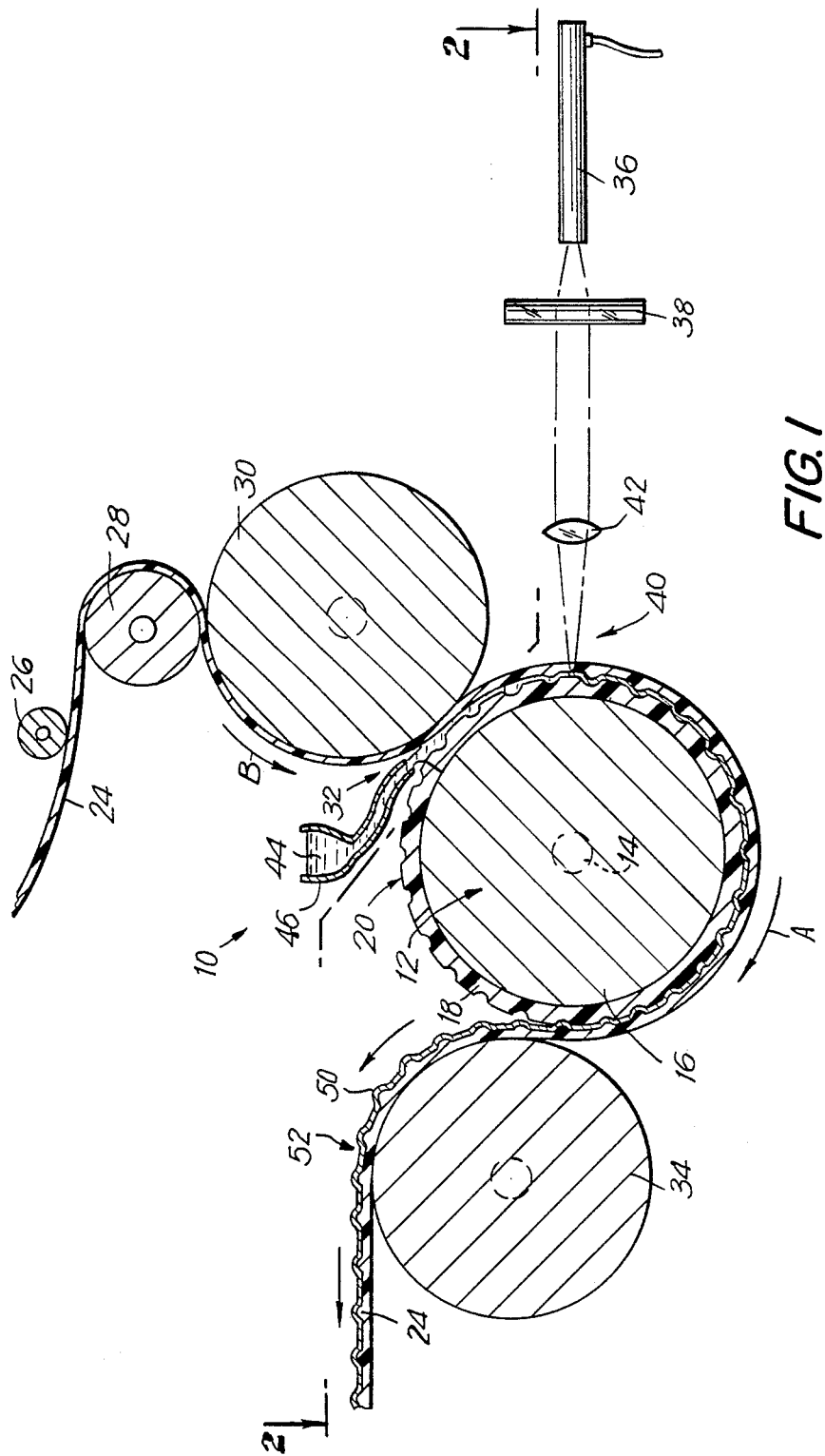
FIG. 1 is a cross-sectional view of an arrangement for mass producing compact discs in accordance with the method of this invention.
Figure 10:
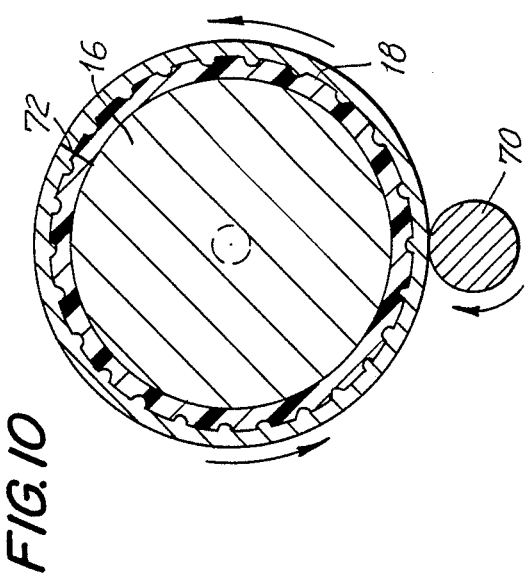
FIG. 10 is a cross-sectional view at another stage of the manufacture of the master roller.

Referring now to the drawings and, more particularly, to FIGS. 1 and 2 thereof, reference numeral 10 generally identifies an arrangement for continuously mass producing optical discs, also known as compact discs, which carry audio and/or video information to be decoded and processed. The arrangement 10 includes a generally cylindrical master roller 12 elongated along, and rotatable in the circumferential direction of curved arrow A by a non-illustrated rotary drive about, an axis of rotation extending along output shaft 14. The master roller 12 has an inner metal cylindrical core 16, and an outer resin coating 18 in which, as explained below in connection with FIGS. 9-12, is preformed at least one, and preferably a plurality of, generally circular, fixed patterns of a compact disc to be produced. The patterns are sequentially arranged one after another in the circumferential direction of arrow A. In a purely exemplary and non-limiting embodiment, the diameter of the roller 12 is on the order of 5 inches. Approximately three fixed patterns, each having a maximum diameter of slightly less than 5 inches, are sequentially arranged on and around an exterior circumferential surface of the resin coating 18.

As shown in FIG. 2, one of the fixed compact disc patterns 20 is located at an upper portion of the roller 12. Fixed pattern 20, as well as all the other fixed patterns, are advantageously comprised of a multitude of recesses or pits, several of which are best shown in the enlarged close-up view of FIG. 3 and are identified by reference numerals 22a, 22b, 22c. The depths, sizes and relative spacing of these pits carry the information which is subsequently read and processed by known circuitry of audio and/or video compact disc players.

Returning to FIG. 1, a transparent, scratch-resistant protective film 24, preferably a polycarbonate having a non-bi-refringing characteristic, and preferably about 5 mils in thickness, is fed lengthwise from a non-illustrated supply roll past a tension roller 26, and trained about an idler roller 28, and conveyed through a nip formed between idler roller 28 and a nip roller 30. The protective film 24 is thereupon guided along the periphery of nip roller 30 in the direction of curved arrow B through another nip 32 formed between nip roller 30 and the master roller 12. The film 24 is guided around the exterior surface of the master roller 12, and then continuously withdrawn from the same by being conveyed onto a take-off roller 34. The take-off roller 34, in turn, conveys the film 24 to additional workstations for further processing as described below in connection with FIGS. 4-8.

As the film 24 enters the nip 32, the film 24 is unpatterned. Thereupon, during the movement of the film 24 about the master roller 12, the aforementioned fixed patterns formed in the coating 18 are each, in their respective turn, successively presented to contact locations spaced apart of one another lengthwise along the film during each rotation of the master roller. An inverse pattern opposite to each fixed pattern 20 is formed at each of said contact locations at a forming workstation 40.

Workstation 40 includes a laser source, e.g. a helium-neon gas laser tube 36 operative, when energized, to emit a collimated laser beam of a predetermined wavelength and energy level toward a cylindrical diverging lens 38 operative for diverging the laser beam in the axial direction (see FIG. 2) across the entire length of the roller 12. A cylindrical converging lens 42 is operative to converge the divergent laser beam in a transverse direction perpendicular to said axial direction. The lenses 38, 42 serve as an optical train operative for optically modifying the emitted laser beam and focusing the same to have a linear cross-section extending axially across the roller 12. The linear laser beam is focused, as shown in FIG. 3, within the film 24 and, more particularly, at an inner side region 48 of the film 24 which faces, and is in contact with, the roller 12.

A dye solution 44, including a dye such as methylene blue, is dissolved in a solvent and mixed, if desired, with another dye to form a solution having an esthetically pleasing color. The dye solution 44 is supplied from a reservoir 46, preferably by means of a gravity feed, and is introduced into the nip 32 between the inner contact surface region 48 and the exterior surface of the resin coating 18. The dye solution may be applied just before the film 24 makes contact with the roller, or the film could be pre-treated with the dye solution.

In any event, the focused laser beam, which extends along a line running along the axis of rotation of the master roller, is in the orange-red spectrum which, as is well known, is the complementary color to that of the methylene blue dye solution. Hence, the laser beam passes through the outer undyed surface region of the film 24, but is absorbed by the inner dyed contact region 48. The laser beam heats the inner dyed contact region 48 very rapidly and intensely, and in a very localized linear area immediately adjacent the pits 22a, 22b, 22c in the resin coating 18. The heat-softened inner dyed contact region 48 begins to flow into the pits and, in fact, eventually completely fills the pits due, in part, to the rapid evaporation of the dye solution, to form projections, e.g. projection 50, whose shapes exactly match the shapes of the corresponding pits, except, of course, being of an inverse or complementary contour.

As shown in FIG. 3, the heat-softened contact region 48 is shown as having partially flowed into recess 22b, and as having fully flowed into recess 22c. The projection 50 is fully formed in recess 22c.

Inverse pattern 52, consisting of a multitude of projections 50, is formed on the film 24, which constitutes a so-called carrier film which is withdrawn from the master roller 12 by the take-off roller 34. A plurality of inverse patterns 52 are consecutively arranged lengthwise along the carrier film. The recesses and projections, and particularly the dye solution layer 44, have been greatly exaggerated in the drawings in order to gain a better understanding of the invention.

Although not shown in the drawings, a mask could be provided at workstation 40 in order to screen out unwanted radiation from reaching the inner contact region 48. A heater could be provided in the immediate vicinity of the master roller in order to help thermally soften the inner contact region 48 of the film. Also, although the invention has been described in connection with the use of a helium-neon laser and a methylene blue dye solution, other lasers, e.g. argon or krypton, and other dye solutions, e.g. cresyl violet or analine orange, could be used. The important feature in the choice of lasers and dye solutions is that they be selected such that the dye solution will absorb the energy of the particular laser beam to cause rapid local heating.

The carrier film 24 formed with projections 50 and covered by a dye solution layer 44 produced by the arrangement 10 of FIGS. 1-3 is reproduced in enlarged view in FIG. 4 for the sake of clarity. In a preferred embodiment, the film 24 is about 5 mils thick, and the thickness of the dye solution is much less than 1 mil.

Further processing of the carrier film proceeds as follows:

First, a metal layer is applied over the projections 50 to form a metallized layer 54. As shown in FIG. 5, aluminum or analogous metal can be vacuum-deposited on top of the film 24. Second, a resin layer 56, of the same refractive index as the film 24, is applied over the metallized layer 54. The resin layer can advantageously be of the ultraviolet-curable type, and is cured, as shown in FIG. 6, by an ultraviolet heater 58. Third, a rigid polycarbonate sheet 60, of the non-bi-refringing type and of the same refractive index as the film 24, is fixed to the resin layer 56, preferably by being pressed thereon between a pair of nip rollers 62, 64, as shown in FIG. 7.

The resulting laminate is shown in FIG. 8. Although not drawn to scale, the carrier sheet 60 has a thickness on the order of 47 mils; the resin layer 56 has a thickness on the order of 10 mils; the aluminum layer 54 has a thickness on the order of 5 mils; the dye layer 44 has a thickness on the order of 0.001 mil; and, as stated earlier, the film 24 has a thickness on the order of 5 mils.

It will be noted, in connection with FIG. 8, that both sides of the aluminum layer 54 are protected by a rigid polycarbonate sheet 60, on the one hand, and by a polycarbonate film 24, on the other hand. The film 24, being on the order of 5 mils, represents a non-negligible thickness sufficient to protect the aluminum layer 54 from damage from below the same. This is in contrast to prior art optical disc constructions wherein the underside of a metallized layer is merely covered by a lacquer less than about 1 mil in thickness.

Figure 9:
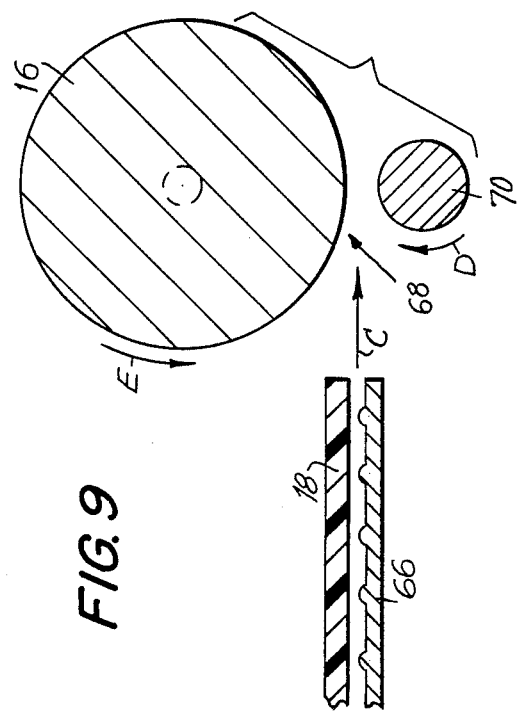
FIG. 9 is a cross-sectional view at one stage of the manufacture of a master roller for use in the arrangement of FIG. 1.

Turning now to FIGS. 9-12, the method of making the master roller is as follows:

A so-called father sheet 66 having a plurality of inverse patterns 52 arranged lengthwise thereof is fed, together with a resin layer (which will eventually become the aforementioned resin coating 18 on the master roller 12), in the direction of arrow C in FIG. 9, to and through a nip 68 formed between metal core roller 16 and a pressure roller 70. Preferably, the resin layer 18 is catalyst-curable. Thereupon, the pressure roller 70 and the core roller 16 are respectively driven in the directions of arrows D and E. The resin layer 18 and father sheet 66 are squeezed between the rollers 16, 70, and are together wrapped around core roller 16. The leading and trailing ends of the resin layer 18 and father sheet 66 are joined together by a resin plug 72.

Figure 12:
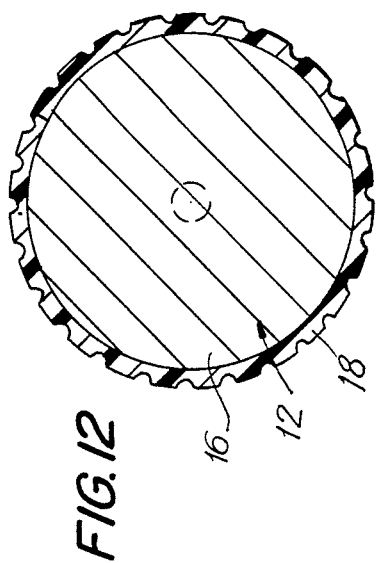
FIG. 12 is a cross-sectional view of the master roller at the conclusion of its fabrication.
Figure 11:
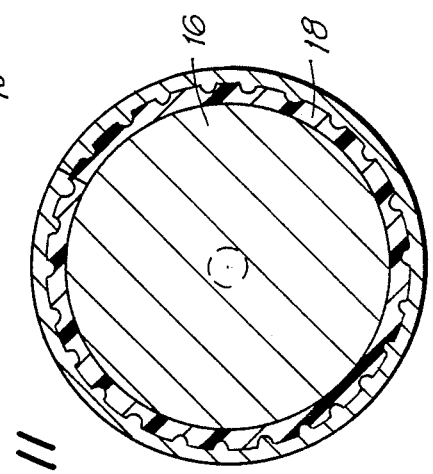
FIG. 11 is a cross-sectional view at still another stage of the manufacture of the master roller.

Thereupon, the pressure roller 70 is removed from pressing engagement with the father sheet 66, which situation is shown in FIG. 11. Next, the father sheet 66 is pulled off, and removed from, the cured resin layer 18. As shown in FIG. 12, the master roller 12 comprises a metal core roller 16 surrounded by a resin coating 18 in which a reverse pattern opposite to the pattern originally provided on the father sheet 66 is formed. Thus, if the father sheet 66 is, as shown in FIG. 9, provided with patterns consisting of projections, then the resin coating 18 is provided with patterns consisting of pits or recesses. The master roller of FIG. 12 can now be used in the arrangement of FIGS. 1-3. In order to prevent the film 24 from adhering to the exterior circumferential surface of the coating 18, a release agent is applied over the cured resin layer 18 to prevent such adhesion.

It will be understood that each of the elements described above, or two or more together, also may find a useful application in other types of constructions differing from the types described above.

While this invention has been illustrated and described as embodied in a method of and arrangement for mass producing damage-resistant compact discs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of continuously mass producing optical discs, comprising the steps of:

(a) forming at least one, generally circular, fixed pattern including a plurality of pits of an optical disc to be produced on an exterior circumferential surface of a rotary roller having an axis of rotation;

(b) continuously feeding an elongated film provided with an energy-absorbing region to the roller so that the energy-absorbing region contacts the exterior surface of the roller;

(c) continuously rotating the roller about the axis of rotation to successively position said at least one fixed pattern at successive contact locations spaced apart of one another lengthwise of the film;

(d) forming an inverse pattern opposite to said at least one fixed pattern at each contact location during each rotating step to form a carrier film along which a series of inverse patterns are formed, said forming step including the step of irradiating the energy-absorbing region with laser energy focused as a linear beam extending axially across the roller on the exterior surface of the roller to locally heat and deform the energy-absorbing region of the film, and cause the locally heated energy-absorbing region of the film to flow into the pits and assume a complementary configuration including a plurality of projections; and (e) continuously withdrawing the carrier film from the roller.

2. The method as recited in claim 1, wherein step (a) is performed by forming a plurality of generally circular fixed optical disc patterns on and circumferentially about the exterior surface of the roller, and wherein step (d) is performed by forming a plurality of inverse patterns opposite to said plurality of fixed patterns during each rotating step.

3. The method as recited in claim 1; and further comprising the step of metallizing over the inverse patterns on the carrier film to form a metallized layer.

4. The method as recited in claim 3; and further comprising the steps of applying a curable resin layer over the metallized layer, curing the resin layer to form a cured layer, fixing a rigid carrier sheet on the cured layer to form a laminate wherein the metallized layer is protected from damage by the rigid carrier sheet on one side of the metallized layer and by the film on the opposite side of the metallized layer.

5. The method as recited in claim 1, wherein step (a) is performed by forming the exterior surface of the roller with a resin coating pre-formed with the at least one fixed pattern.

6. A method of continuously mass producing optical discs, comprising the steps of:

(a) forming at least one, generally circular, fixed pattern of an optical disc to be produced on an exterior circumferential surface of a rotary roller having an axis of rotation;

(b) continuously feeding an elongated film to the roller and into contact with the exterior surface of the roller, and feeding an energy-absorbing dye layer between the film and the exterior surface of the roller;

(c) continuously rotating the roller about the axis of rotation to successively position said at least one fixed pattern at successive contact locations spaced apart of one another lengthwise of the film;

(d) forming an inverse pattern opposite to said at least one fixed pattern at each contact location during each rotating step to form a carrier film along which a series of inverse patterns are formed, said forming step including the step of irradiating the energy-absorbing dye layer with laser energy focused as a linear beam extending axially across the roller on the exterior surface of the roller to locally heat and deform the energy-absorbing dye layer; and (e) continuously withdrawing the carrier film from the roller.

* * * * *